United States Patent [19]

Van Becelaere

[11] Patent Number: 5,379,792

[45] Date of Patent: Jan. 10, 1995

[54] DAMPER WITH BLADE FOR SENSING PRESSURE DIFFERENTIAL

[75] Inventor: Robert M. Van Becelaere, Lake Lotawana, Mo.

[73] Assignee: Tomkins Industries, Inc., Dayton, Ohio

[21] Appl. No.: 140,672

[22] Filed: Oct. 21, 1993

[51] Int. Cl.6 .................. F16K 37/00; G01F 1/42
[52] U.S. Cl. ............................. 137/12; 137/557; 73/861.62
[58] Field of Search ............... 137/12, 557; 73/861.42, 73/861.47, 861.52, 861.53, 861.61, 861.62

[56] References Cited

U.S. PATENT DOCUMENTS 3,640,307  2/1972  Drzala ............................. 137/557
3,695,105 10/1972  Carlson ......................... 73/861.62

*Primary Examiner*—John Rivell
*Attorney, Agent, or Firm*—Shook, Hardy & Bacon

[57] ABSTRACT

A fluid flow control damper having one or more blades for sensing pressures to determine velocity pressure in the flow stream. The airfoil damper blade has fluid intake openings in a portion of the blade which extends into the fluid stream upstream of the damper and it has inlet openings in a portion of the blade which extends into the stream downstream of the damper. Pressurized fluid from each side of the damper is conducted through separate chambers in the blade and through outlets on the blade axis to instrumentation which reads the pressures and computes the pressure differential between the pressures at each side of the damper. The pressure inlet openings are disposed in elongated channels along the side edges of the blade to protect the inlets from spurious pressure fluctuations which would adversely affect the accuracy of the pressure sensings.

16 Claims, 1 Drawing Sheet

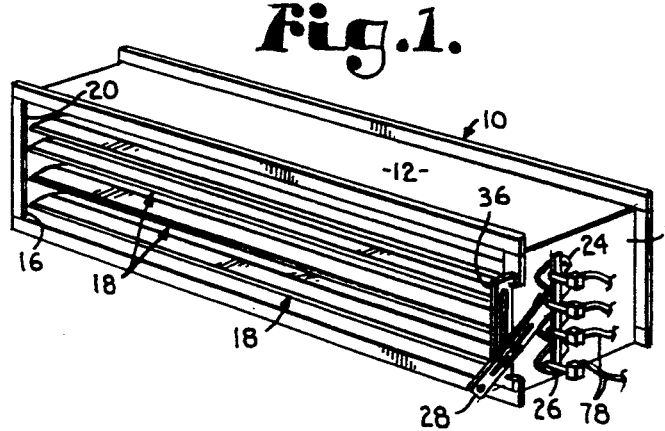
Fig.1.
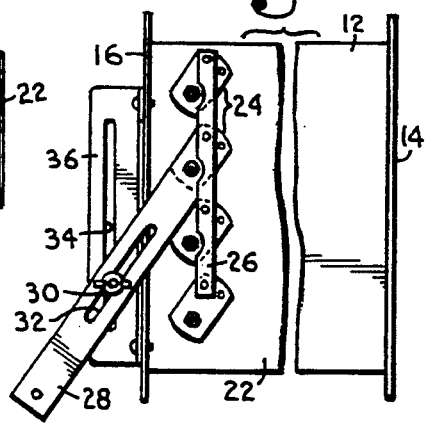
Fig.2.
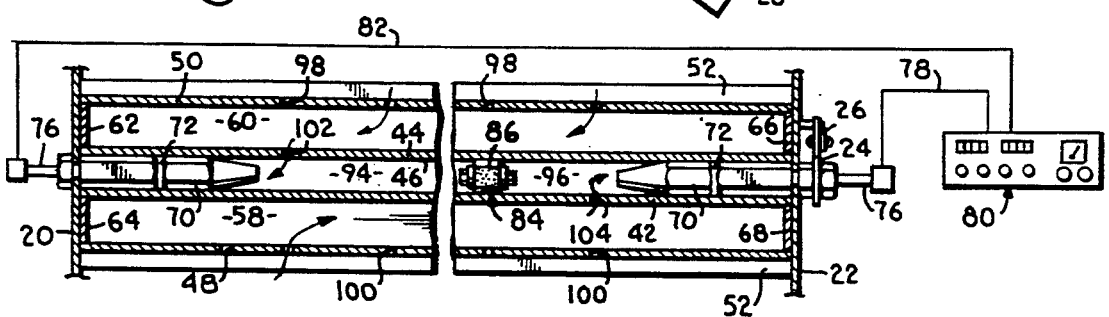
Fig.3.
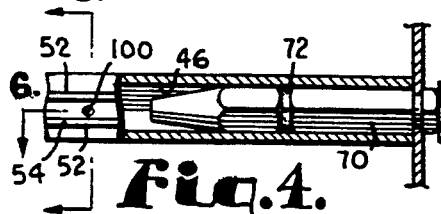
Fig.4.
Fig.5.
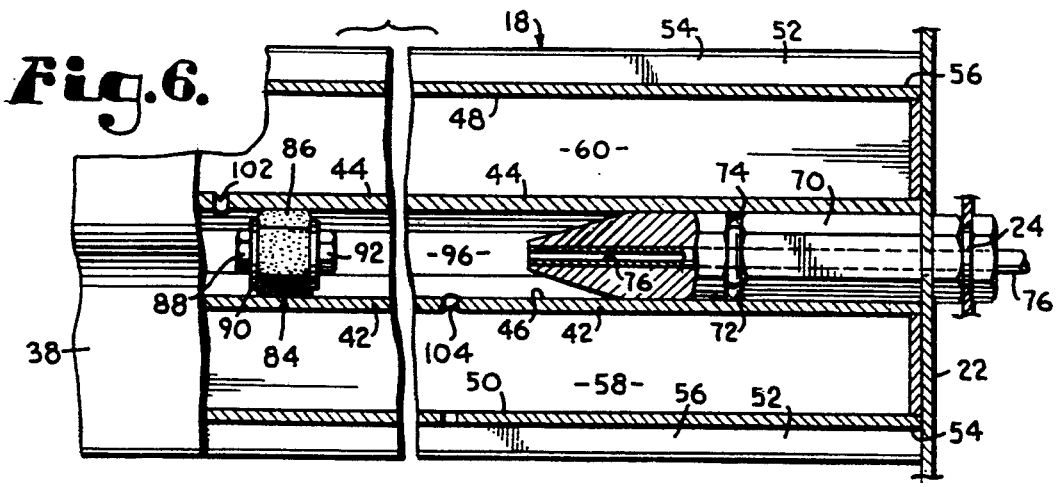
Fig.6.

DAMPER WITH BLADE FOR SENSING PRESSURE DIFFERENTIAL

This invention relates to dampers for regulating fluid flow and more particularly, to a novel damper blade construction which may be used for sensing the velocity pressure and static pressure of fluid flowing across the blade.

Dampers are employed for controlling flow of gasses in a variety of situations. They are conventionally used to control the amount of fresh air which is admitted into buildings. Energy conservation purposes generally dictate that the amount of fresh air admitted to a building be kept to a minimum. On the other hand, it is necessary that a certain minimum flow of fresh air be maintained to prevent build up of pollutants in the building. Such build up causes a condition which has come to be known as "sick building syndrome". The necessity for maintaining a balance between meeting fresh air requirements and conserving energy makes control of air flow very important.

Conventionally, the air flow an each side of a damper is sensed by a Pitot tube sensor or by other suitable sensing devices installed in the air stream. The pressure upstream of the damper consists of a combination of the velocity pressure (Vp) plus the static pressure (Sp). The measured pressure immediately downstream of the damper consists essentially of only static pressure if the fluid is admitted to a sensing device which faces downstream to eliminate the effect of the velocity of the stream on the measurement. The difference between these pressures is the velocity pressure. This figure, for all practical purposes with which we are here concerned, is directly proportional to the flow across the damper. Thus, Vp can be used for determining how the damper should be adjusted to provide a predetermined flow through the damper.

A problem encountered in damper regulation with heretofore available technology has been the necessity for obtaining pressure readings for use in adjusting the dampers used in controlling the flow. It is often difficult to insert pressure sensing instruments at proper locations in the stream for taking pressure readings. If sensing apparatus such as Pitot tubes are installed at the time of construction, they are often difficult to reach for servicing and they may appreciably add to the cost of the installation. Further, the turbulence of flow downstream from the dampers often prevented accurate readings of Sp by auxiliary sensing devices. The actual values of the parameters of the pressures involved are often so small as to hamper obtaining accurate readings from the devices. Also, it is not always possible to position such devices where they can be most effective in sensing changes in pressure differentials caused, e.g. by gusts of wind or changes in wind direction.

Accordingly, it is a primary object of this invention to provide a damper provided with a blade which is constructed in a manner so that the blade itself is useful for sensing pressure differential at the damper without the necessity for auxiliary sensing equipment.

It is another important object of this invention to provide such a damper blade construction so that the blade is capable of furnishing even more reliable pressure sensings than those which are ordinarily available from the use of conventional sensing equipment.

A yet further important object of the present invention is to provide a damper blade of this type which may be relatively economically constructed utilizing heretofore available blade construction technology without the necessity for relatively expensive modifications to the basic blade design.

These and other important aims and objectives of the present invention will be further explained or will become apparent from the following explanation and description of the drawings.

In the drawings:

FIG. 1 is a perspective view on a reduced scale of a damper having blades embodying the principles of this invention, the connections for communicating pressure sensings to pressure indicating apparatus being shown fragmentally;

FIG. 2 is a fragmentary side elevational view of the damper of FIG. 1;

FIG. 3 is a fragmentary, partly schematic detailed horizontal cross-sectional view through the damper showing one of the blades in cross-section and illustrating typical connection with a pressure reading instrument, arrows indicating communication of the blade chambers with flow in the stream;

FIG. 4 is an enlarged, detailed fragmentary view similar to FIG. 3 but showing the blade in rear elevation, parts being broken away to reveal details of construction;

FIG. 5 is a further enlarged cross-sectional view taken along line 5—5 of FIG. 4; and FIG. 6 is a detailed fragmentary cross-sectional view taken along line 6—6 of FIG. 4, parts being broken away to reveal details of construction.

A damper embodying the principals of this invention is broadly designated in the drawings by the numeral 10. Damper 10 comprises a rectangular frame 12 adapted to be interposed in a fluid stream such as in an air duct or the like for controlling the flow of the air in the duct. Damper 10 has an upstream end 14 and a downstream end 16. A plurality of elongated rigid blades 18 have their opposite ends supported by the frame for limited rotative movement about the longitudinal axis of the blade.

In the embodiment of damper 10 chosen for illustration, damper 10 is provided with four identical blades 18 having their respective ends journaled at vertically spaced apart locations in the respective end panels 20 and 22 as illustrated in the drawings. A crank arm 24 for each blade 18 is rigidly connected to the axle of the latter exteriorly of end panel 22 and the four crank arms are pivotally connected to an elongated, rigid link 26 for rotating the blades in unison about their respective axes.

An elongated, rigid operating arm 28 is pivotally mounted on one of the blade axles and is also pivotally secured to link 26 in a manner to effect longitudinal movement of the link by the swinging of the operating arm 28. The longitudinal movement of the link swings the blades on their axes to move the blades from fully opened positions as shown in FIG. 1 of the drawing to relatively closed positions wherein the blades are positioned to block the flow of fluid through the damper. Manifestly, the blades may be positioned at any intermediate condition to adjust the stream of flow through the damper as may be desired.

A releasible fastener 30 such as a bolt with a wing nut cooperates with an elongated slot 32 in operating arm 28 and an elongated slot 34 in a flange 36 mounted on the downstream end of frame 12 adjacent operating arm 28, to releasibly fix the latter in whatever position may be required to dispose the attached blades in proper positions in the fluid stream to attain the desired flow through the damper.

In the preferred construction, each blade 18 is constructed substantially as shown in FIGS. 3-6 of the drawing. It will be recognized, however, that many of the goals of this invention can be achieved with at least one, but possibly less than all of the blades of the damper configured in this manner. In such case, the remainder of the blades could be of conventional construction with the pressure sensing functions carried out by the blade or blades 18 configured as shown in FIGS. 3-6 of the drawing.

Blade 18 is illustrated in transverse cross-section in FIG. 5 of the drawing. The blade is preferably formed of aluminum or aluminum alloy or other suitable materials capable of being formed in an extrusion process to present a multi-chambered cross-section having an airfoil configuration with an upper outer surface 38 and a lower surface 40. Surfaces 38 and 40 are spaced apart and taper inwardly toward one another in a symmetrical fashion on either side of the central longitudinal axis of the blade as shown best in FIG. 5.

A transverse wall 42 on one side of the blade axis and a similar, oppositely angled wall 44 on the opposite side of the axis in symmetrically spaced apart relationship from wall 42 as shown in FIG. 5 provides an elongated hexagonally shaped conduit 46 extending the entire length of the blade as illustrated in the drawings. Walls 48 and 50 proximal opposite side edges of blade 18 cooperate with respective pairs of outwardly projecting, spaced apart flanges 52 extending the length of the blade to present a side edge channel 54 and 56 at opposite edges of the blade.

A chamber 58 is formed by the cavity which exists between walls 42 and 48 and between the upper and lower surfaces of the blade as shown in FIG. 5. Similarly, a chamber 60 is presented by the cavity formed between walls 44 and 50 and between the upper and lower surfaces of the blade. The blade ends are closed and sealed by a plurality of end plates 62-68 disposed across the chambers 58 and 60 as shown in FIGS. 3 and 6 of the drawing.

Each end of each blade 18 is provided with a stub shaft 70 which extends into its corresponding end of conduit 46 in telescoped relationship as illustrated in the drawing. The shafts 70 project outwardly from conduit 46 through suitable holes (not shown) in the corresponding frame end panels 20 and 22 to journal the blade for its rotative movement on its axis in the damper. Shafts 70 close the opposed ends of conduit 46 and seal the conduit by means of an O-ring 72 around each stub shaft and disposed in sealing relationship between the stub shaft and the conduit inner wall. To this end, it is preferred that each stub shaft be configured to present an O-ring receiving grove 74 as shown best in FIG. 6 of the drawing.

Each stub shaft 70 is drilled to present an axially extending bore which receives in telescoped relationship therewith a tube 76 which communicates with conduit 46 at the inner end of the shaft and which projects outwardly beyond the damper frame and the control linkage as best shown in FIGS. 3 and 6 of the drawing. Tube 76 at one end of the blade is adapted to be connected by a hose or line 78 with instrumentation 80 for reading fluid pressure in the line. The tube 76 at the other end of the blade is connected by a hose or line 82 with instrumentation 80 for the same purpose.

The cavity in the blade presented by conduit 46 plugged at its opposite ends by the stub shafts 70 is further divided into a pair of separated cavities disposed axially of the blade by a sealing device 84 interposed in the conduit intermediate and spaced from the respective conduit sealing shafts 70. Device 84 may take the form of an appropriately shaped body 86 of a relatively resilient material such as rubber, neoprene or the like having a transversely extending bore (not shown) which receives a bolt 88 therethrough as illustrated. The bolt cooperates with washers 90 and 92 disposed on opposite faces of body 86 so that tightening the bolt causes device 84 to expand circumferentially to effectively seal conduit 46. This divides the cavity of the conduit into a pair of distinct axially disposed chambers 94 and 96.

A plurality of holes, 98 spaced apart as shown in FIG. 3 of the drawing extend transversely through wall 50 of blade 18 to communicate chamber 60 with the pressurized fluid from the stream which is in channel 56 at the upstream side of the damper. Similarly, wall 48 of the blade is provided with a plurality of spaced apart, transversely extending holes 100 to communicate the pressurized fluid from the stream which is channel 54 at the downstream side of the damper with chamber 56 in the blade. As is apparent from the drawings, and particularly FIGS. 3 and 5, the diameter of holes 98 and 100 is substantially less than the transverse dimension of chamber 60 and 58, respectively. At least one hole 102 in wall 44 communicates chamber 60 with the axially disposed chamber 94 and a similar hole 104 in wall 42 communicates chamber 58 with the second axially disposed chamber 96 as shown in FIG. 3 of the drawing.

When damper 10 is installed across a flow of air or the like, the pressurized fluid upstream of the damper is admitted through upstream facing holes 98 and it communicates through hole 102 with chamber 94. The latter is in communication through its proximal stub shaft 70 and tube 76 with line 82 which provides the fluid pressure to instrument 80 to be read by the latter. The pressure in line 82 is the pressure at the upstream side of the damper since the fluid admitted into the line comes from the stream through the portion of the blade which extends into the fluid stream on the upstream side of the blade axis.

In like fashion, the pressure of the fluid in line 78 which is conducted to instrument 80 to be read by the latter is fluid which is admitted into the line through the portion of the blade which projects into the stream on the downstream side of the blade axis. The inlet holes on this side of the blade are facing downstream. Accordingly, the pressure in line 78 represents the pressure in the stream downstream of the damper devoid of any velocity component. Neither of these pressures represents velocity pressure (Vp) which is proportional to the rate of flow in the stream and can be used for purposes of controlling the flow rate. Instead, as mentioned before, the pressure sensed through line 82 consists of both velocity pressure and static pressure. This quantity, per se, is relatively useless for purposes of properly controlling the rate of flow.

However, the pressure sensed through line 78 from the downstream side of the damper is static pressure and, as mentioned above, is substantially devoid of any appreciable increment of velocity pressure. Accordingly, it is a simple matter of subtracting the pressure sensed through line 76 from the downstream side of the blade from the pressure sensed through line 82 from the upstream side of the blade. The resultant is the desired velocity pressure (Vp) parameter.

The differential pressure value (Vp) can be utilized by an operator for appropriating adjusting the blade positions to effect the desired control of the flow rate through the damper. It will be recognized by those skilled in the art, however, that the differential pressure, as determined by instrument 80, could be utilized, if desired, to directly control a blade operating device (not shown) coupled with the damper to automatically move the blades to the appropriate flow controlling positions without human operator involvement.

Instrument 80 preferably includes a diaphragm type meter which receives the downstream static pressure on one side of the diaphragm and the static pressure plus velocity pressure from the upstream side of the damper on the other side of the diaphragm, giving a net result of velocity pressure. Through empirical testing of dampers having blades constructed as described herein, applicant has determined that the differential pressure parameters available from the blade are at least twice that of the computed theoretical value of the actual differential pressure. This makes the signal from the pressure sensing equipment 80 much more useful than comparable signals when conventional sensing equipment and damper blades are used.

Applicant theorizes that this amplification of the signal may be the result of turbulence at the downstream side of the blade. In any event, the relatively large readings which are obtainable through the use of dampers equipped with blades as described are substantially more useful than readings from conventional pressure sensitive devices which have heretofore been used for this purpose. The projecting lips defining the inlet channels on each side of the blade protect the inlet openings and insure that a relatively uniform application of pressurized fluid from the stream is admitted to the reading instrument irrespective of variations in the stream flow which can occur, for example, as a result of wind gusts and other phenomena.

It should be pointed out at this juncture that the transfer of the pressurized fluid to the axis of the damper and the piping of the fluid through the damper axles permits the readings to be taken constantly without inhibiting the movement of the blades when it is necessary to change the blade positions for control purposes. Further, by utilizing a blade construction which is compatible with formation of the blade through currently existing extrusion processes, the principals of this invention may be carried out with little if any appreciable increase in blade cost over that of conventional blades.

Having thus described the invention, I claim:

1. A blade for a damper adapted to be interposed in a gaseous fluid stream for controlling fluid flow, said blade comprising:
    an elongated, rigid body adapted to be supported at opposite ends for limited rotative movement about an axis extending longitudinally of the blade with a first portion of the body extending on the upstream side of said axis and a second portion of the body extending downstream of said axis;
    a pair of chambers formed in the blade;
    at least one hole defined by said upstream blade portion and communicating with one of said chambers for pressurizing the one chamber with stream fluid upstream of the blade, the diameter of the hole being substantially less than the transverse dimension of the chamber;
    at least one opening defined by said downstream blade portion and communicating with said other chamber for pressurizing said other chamber with fluid downstream of the blade, the diameter of the opening being substantially less than the transverse dimension of said other chamber; and
    means operably coupled with each of said chambers for sensing the pressure in the corresponding chamber, said sensing means being adapted for coupling with instrumentation for determining the pressure differential between the chambers to indicate the flow rate in said stream.

2. A blade as set forth in claim, wherein said blade is of airfoil configuration comprising a pair of opposite blade surfaces tapering toward each other on opposite sides of said axis, and wherein said chambers are disposed intermediate said surfaces.

3. A blade as set forth in claim 2, wherein each of said chambers comprises a pair of intercommunicating chamber cavities, one of said cavities of each pair being disposed axially of the blade, and wherein the blade includes means for communicating with said axially disposed cavities and adapted to be communicated with pressure sensing instrumentation for determining the pressure in said axially disposed cavities.

4. A blade as set forth in claim 3 wherein the blade is provided with an axle at each end of the blade for supporting the blade for said rotative movement, the communicating means for its corresponding axially disposed cavity being carried by each axle respectively.

5. A blade as set forth in claim 4, wherein the blade is provided with an elongated conduit extending axially through the blade, the axles being received in opposite ends of the conduit in sealing relationship therewith and projecting outwardly from the corresponding ends of the blade, and means extending across the conduit in spaced relationship from the respective axles for sealing the conduit to divide the latter into said axially disposed cavities.

6. A blade as set forth in claim 5, wherein said communicating means comprises a tubular opening for each axle respectively, each opening extending through its corresponding axle and communicating with its corresponding axially disposed cavity.

7. A blade for a damper adapted to be interposed in a fluid stream for controlling flow of the fluid, said blade comprising:
    an elongated blade body having a pair of spaced apart blade edges, said body being adapted for rotation on an axis extending along the blade intermediate the edges with one of said edges disposed in the flow at the upstream side of the body and the other edge disposed in the flow on the downstream side of the body;
    said body being configured to present a pair of chambers in the body;
    means communicating one of said chambers through said one edge with the flow upstream of the body to pressurize said one chamber by the pressure of the flow;
    means communicating the other chamber through said other edge with the flow downstream of the body to pressurize said other chamber by the pressure of the flow; and
    sensing means in communication with each of said chambers for determining the pressure difference in the flow between said edges.

8. A blade as set forth in claim 7, wherein said communicating means for each chamber comprises at least one opening in each blade edge communicating between said stream and a corresponding one of said chambers.

9. A blade as set forth in claim 8, wherein each edge is provided with a plurality of openings disposed at spaced apart intervals along the edge communicating between said stream and said corresponding chambers.

10. A blade as set forth in claim 8, wherein each of said blade edges includes a wall extending longitudinally of the blade, and a pair of spaced apart flanges projecting axially outwardly beyond the wall to define a channel therebetween, said opening extending through the wall to communicate the corresponding chamber with the stream in the channel.

11. A damper for controlling a flow of gaseous fluid in a stream, said damper comprising:
   a frame defining a rectangular opening and adapted to be mounted in said stream for flow of the latter through said frame opening;
   at least one damper blade extending across said opening and having ends adjacent the frame, the blade having generally parallel extending, spaced apart side edges;
   axle means at the blade ends for supporting the blade in the frame for rotating about the longitudinal blade axis between open and closed positions in the frame;
   said blade including an elongated, rigid blade body with one side edge disposed upstream of the axis and the other side edge disposed downstream of said axis;
   a pair of chambers formed in the blade;
   means carried by the upstream blade side edge for pressurizing one of said chambers with fluid in the stream upstream of the damper;
   means carried by the downstream blade side edge for pressurizing the other chamber with fluid downstream of the damper; and
   means operably coupled with each of said chambers respectively for sensing the pressure in the corresponding chamber and adapted to be operably coupled with instrumentation for determining the pressure differential between the chambers for indicating the rate of flow in the stream.

12. A damper as set forth in claim 11, wherein each of said chambers comprises a pair of chamber cavities, one of said cavities being disposed axially of the blade, and wherein each axle means comprises a stub shaft for each end of the blade respectively, said communicating means including a passage extending through the shaft and communicating with a corresponding axially disposed cavity to permit determining said differential pressure through the shafts to minimize interference with the rotation of said blade.

13. A method for determining the relative rate of flow of pressurized gaseous fluid in a stream through a damper with at least one damper blade having a pair of separate chambers contained in the blade, said method comprising:
   introducing pressurized fluid into said first chamber of the blade from a first opening in a portion of the blade disposed to receive flow from the stream upstream of the blade, the diameter of the first opening being substantially less than the transverse dimension of said first chamber;
   introducing pressurized fluid into said second chamber of the blade from a second opening in a portion of the blade disposed to receive flow from the stream downstream of the blade, the diameter of the second opening being substantially less than the transverse dimension of said second chamber; and
   sensing the pressure in each of said first and second chambers to obtain an indication of said rate of flow.

14. A method as set forth in claim 13, wherein the method includes the step of calculating the difference between said pressures, whereby the difference provides the indication of said flow rate.

15. A method as set forth in claim 14, wherein said sensing step is carried out by flowing pressurized fluid from each of said chambers to instrumentation for determining said pressure differential.

16. A method as set forth in claim 15, wherein said flowing step is carried out by conducting the pressurized fluid from the blade along the axis thereof to minimize interference with the rotation of the blade.

* * * * *

UNITED STATES PATENT AND TRADEMARK OFFICE
CERTIFICATE OF CORRECTION

PATENT NO. : 5,379,792
DATED : January 10, 1995
INVENTOR(S) : Robert M. Van Becelaere It is certified that error appears in the above-indentified patent and that said Letters Patent is hereby corrected as shown below:

Column 6, line 13 of the printed patent (line 1 of claim 2), after the word "claim", please insert the numeral --1--.

Signed and Sealed this

Twenty-third Day of May, 1995

Attest:

BRUCE LEHMAN

Attesting Officer  Commissioner of Patents and Trademarks